Feb. 8, 1966 — B. G. BOWDEN — 3,233,916
VELOCIPEDE FRAME
Filed Feb. 13, 1964 — 4 Sheets-Sheet 2
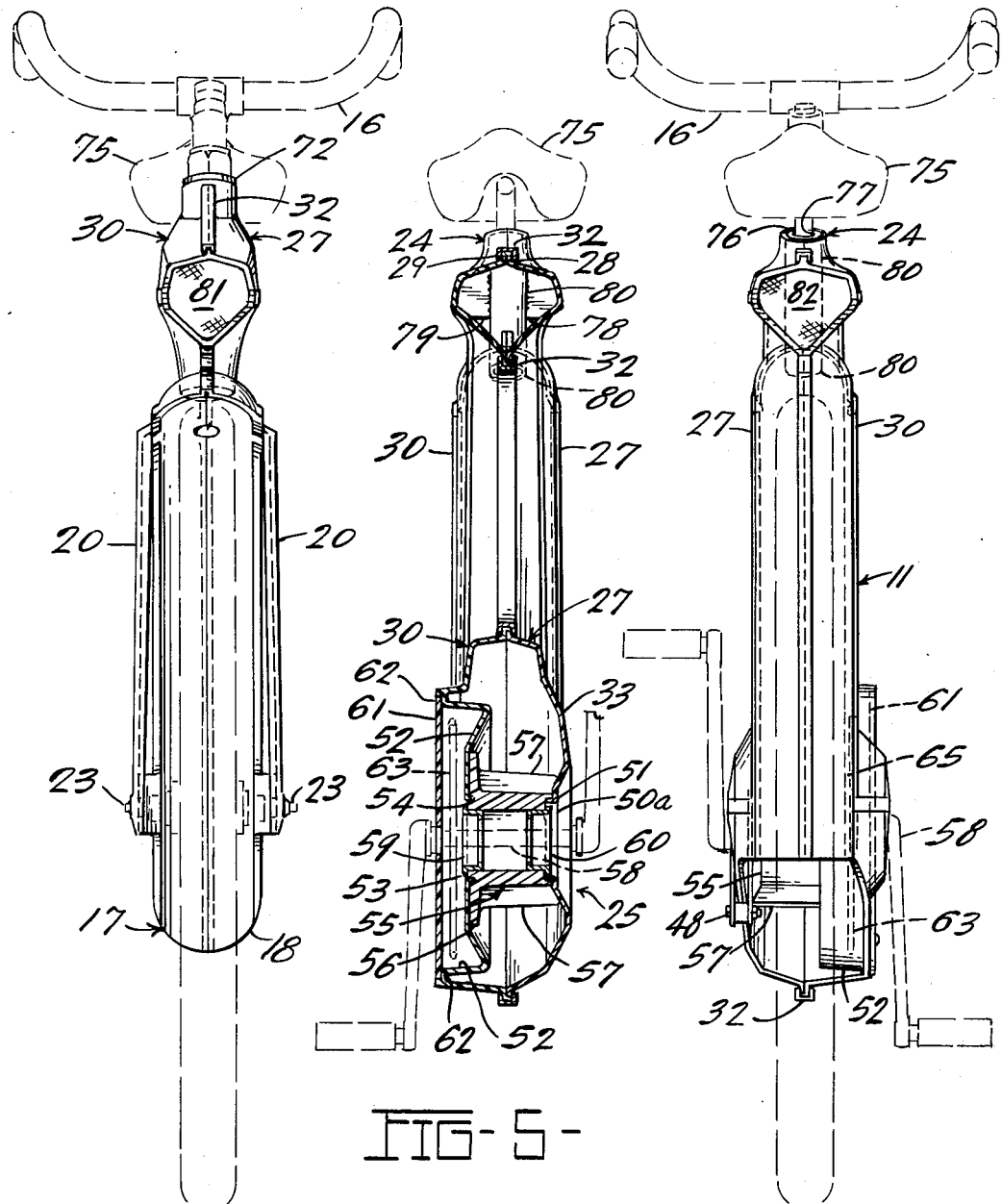
FIG-4-
FIG-5-
FIG-6-
INVENTOR:
BENJAMIN G. BOWDEN.
BY Owen + Owen
ATT'YS.

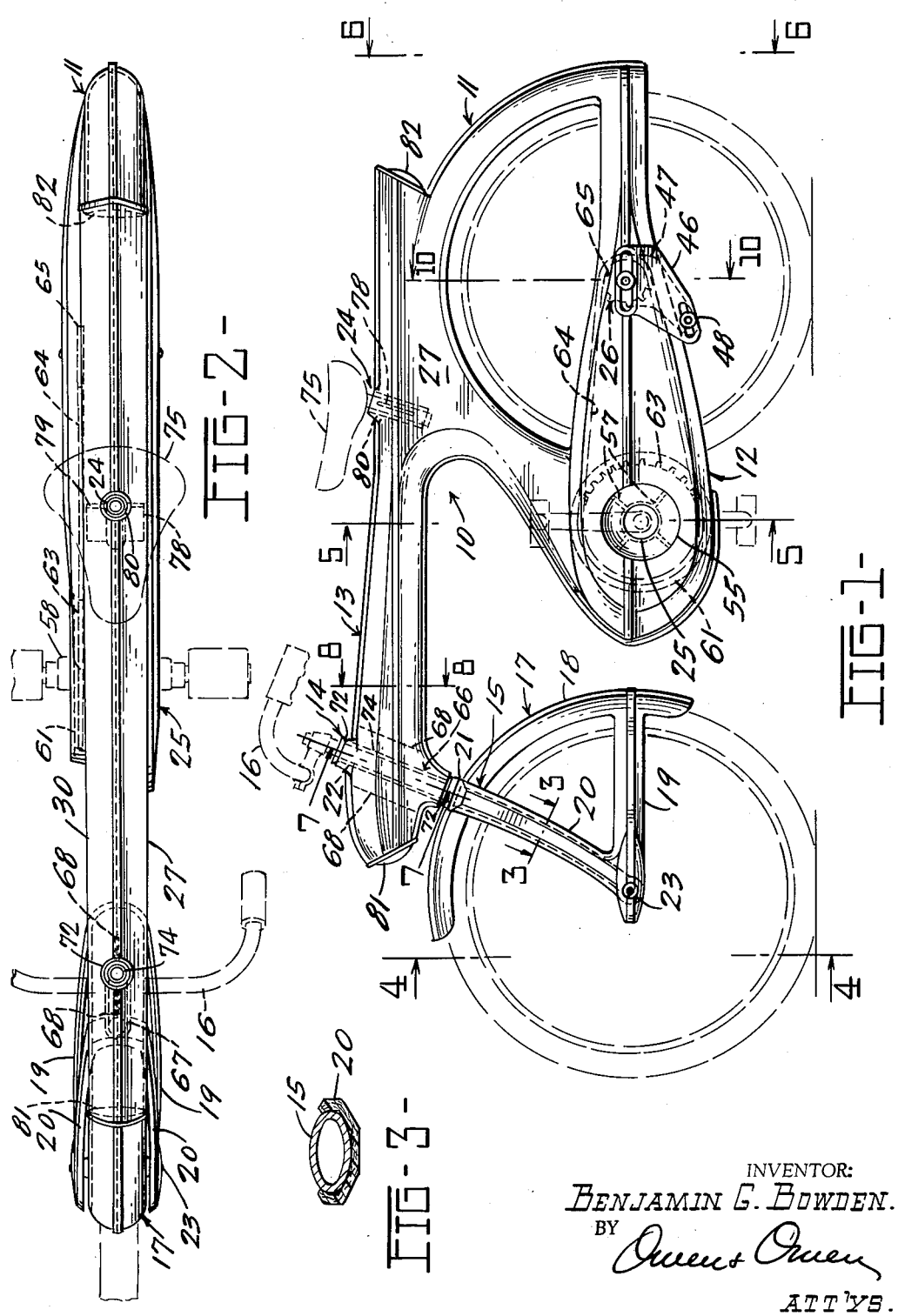

Feb. 8, 1966  B. G. BOWDEN  3,233,916
VELOCIPEDE FRAME
Filed Feb. 13, 1964  4 Sheets-Sheet 3
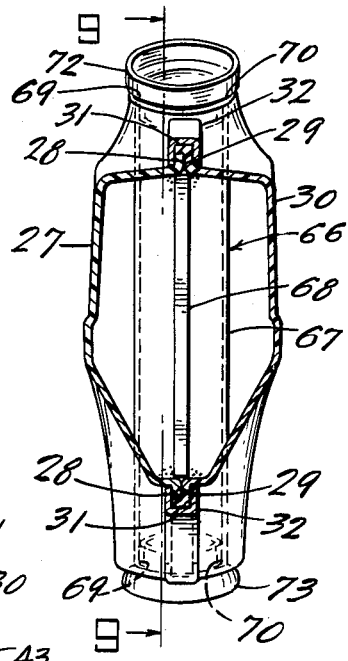
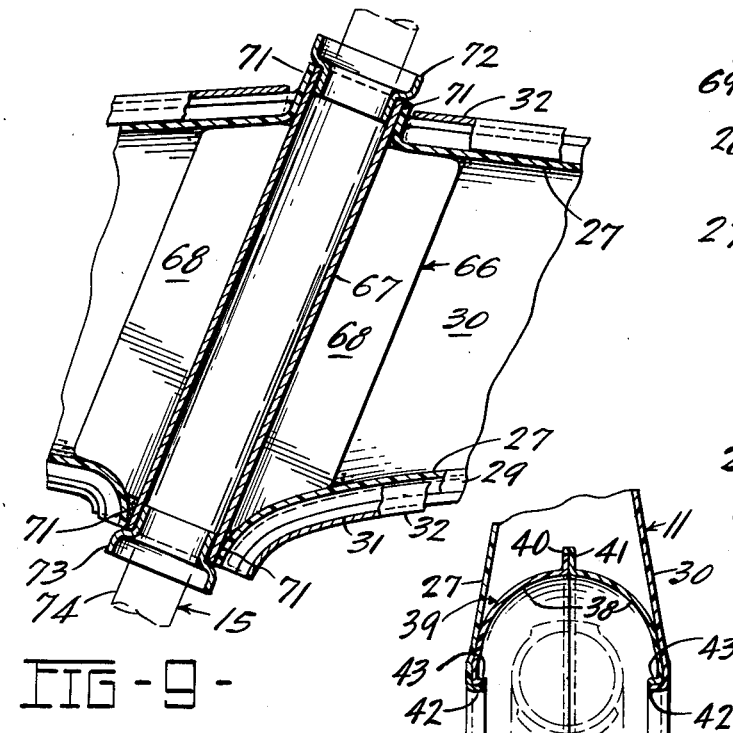
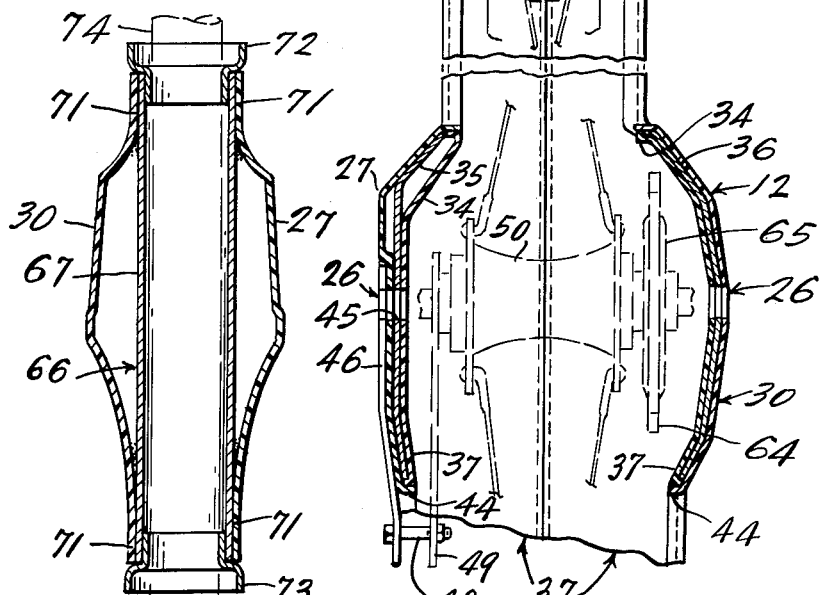
INVENTOR:
BENJAMIN G. BOWDEN.
BY Owen + Owen
ATTYS.

Feb. 8, 1966 B. G. BOWDEN 3,233,916
VELOCIPEDE FRAME
Filed Feb. 13, 1964 4 Sheets-Sheet 4
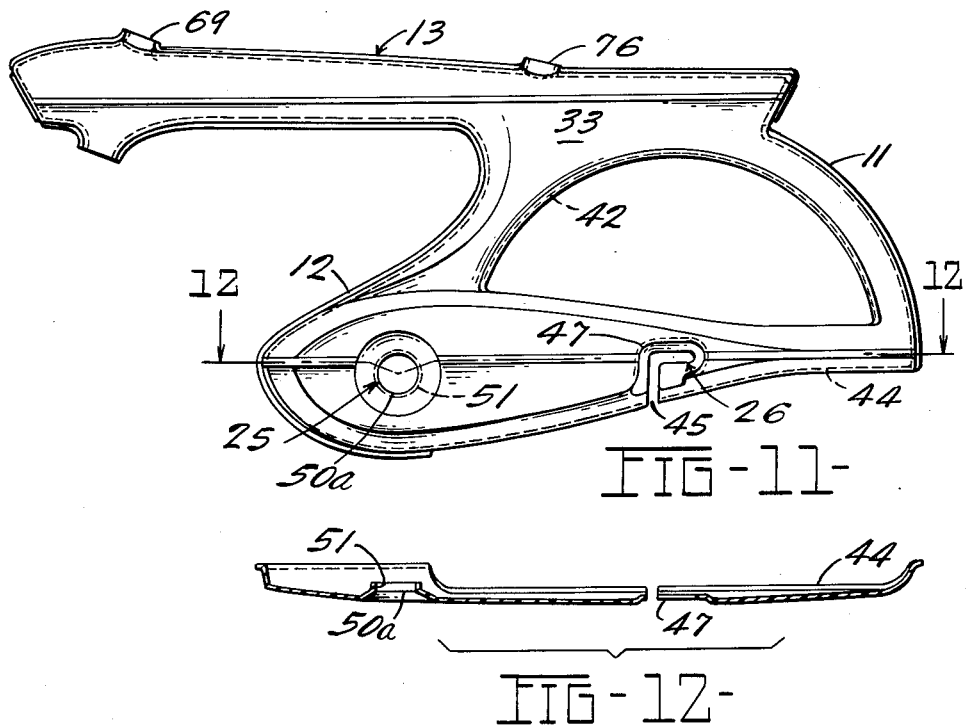
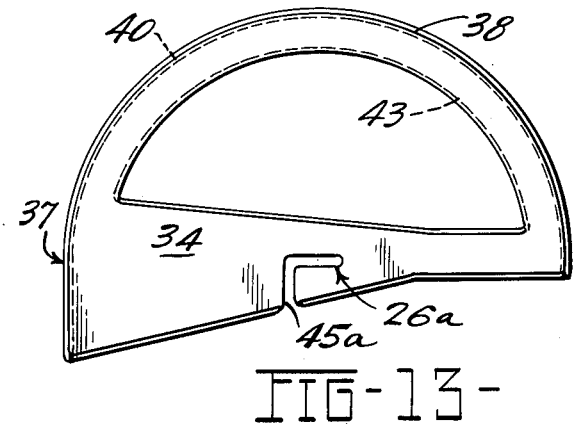
INVENTOR:
BENJAMIN G. BOWDEN.
BY Owen + Owen
ATT'YS.

United States Patent Office 3,233,916
Patented Feb. 8, 1966

3,233,916
VELOCIPEDE FRAME
Benjamin G. Bowden, 2331 E. Grecourt Drive,
Toledo, Ohio
Filed Feb. 13, 1964, Ser. No. 344,565
6 Claims. (Cl. 280—274)

This invention relates to a frame for a vehicle such as a bicycle, and more particularly to a vehicle frame comprised of two lightweight, preformed half shells secured together along a longitudinal axis to form a unitary, hollow vehicle frame.

A vehicle frame of a lightweight material, such as a fiber glass reinforced resin or lightweight sheet metal, is particlularly desirable for bicycles or other small vehicles which are manually propelled and often lifted and carried from one place to another. However, due to the necessity that such a vehicle frame be rigid and have high resistance to compression and shear stress, it has been heretofore necessary to provide reinforcement at certain areas of the frame which are subject to stress, such as the steering post bearing, the wheel spindle supports, etc. It has been the practice of designers and manufacturers to insert tubular steel bars as reinforcing frame members throughout a fiber glass reinforced resin or sheet metal vehicle frame. While such constructions have been somewhat satisfactory from a standpoint of rigidity and resistance to compression and shear forces, the added weight of the reinforcing bars has detracted from the desirability of the end product.

Vehicle frames comprised of molded half shells of a fiber glass reinforced resin have numerous advantages in addition to their lightweight characteristics. Such frames may be easily manufactured of a molded thermosetting resin which is corrosion and impact resistant and may be impregnated with a suitable color. However, as previously explained, heretofore such attempts have been commercially unsatisfactory due to the necessity of including tubular reinforcing elements which add to the weight of the vehicle frame and which also materially increase the cost of production.

Accordingly it is an object of this invention to provide a lightweight vehicle frame comprised of two half shells of a molded or pressed sheet material which, when secured together, form a rigid frame resistant to compressive and shear forces.

It is another object of this invention to provide such a lightweight vehicle frame which has a minimal number of internal reinforcing members of the same material which greatly increase the resistance to distortion and rigidity of the frame.

It is still another object of this invention to provide a lightweight vehicle frame comprised of two unitary half shells of a lightweight material, wherein said half shells are reinforced at points of stress by internal members of a similar material secured to the inner surfaces of the shells and wherein said half shells are secured in abuting relationship to form a unitary frame member enclosing said internal members.

It is yet another object of this invention to provide a lightweight vehicle frame comprised of two unitary half shells of a lightweight, moldable fiber glass reinforced resin wherein said half shells, when secured together, comprise a unitary, streamlined vehicle frame which encloses and secures interior reinforcing members and support means for the various working parts of the vehicle.

Other objects and advantages will be apparent from the description of a specific embodiment of this invention taken in conjunction with the drawings in which:

FIG. 1 is a view in elevation of a complete bicycle including a frame constructed in accordance with this invention;

FIG. 2 is a plane view of the bicycle frame shown in FIG. 1, shown on a slightly enlarged scale;

FIG. 3 is a sectional view greatly enlarged, taken along the line 3—3 of FIG. 1, showing the construction of the front wheel cover support and the front wheel fork;

FIG. 4 is a front view of the bicycle frame shown in FIG. 1, taken from the position indicated by the line 4—4 of FIG. 1, and shown in an enlarged scale;

FIG. 5 is an enlarged, cross sectional view of the bicycle frame of FIG. 1 taken along the line 5—5 of FIG. 1 and showing the detail of the pedal bearing construction within the frame of this invention;

FIG. 6 is a rear view of the bicycle frame of FIG. 1 taken from the position indicated by line 6—6 of FIG. 1, shown on an enlarged scale;

FIG. 7 is a greatly enlarged cross sectional view of the upper cross member of the frame of the bicycle, taken along line 7—7 of FIG. 1, showing the internal construction of the steering post;

FIG. 8 is a greatly enlarged cross sectional view of the cross bar of the bicycle frame taken along the line 8—8 of FIG. 1, and showing in detail the method of joining the two half shells of the bicycle frame;

FIG. 9 is a side view in cross section taken along line 9—9 of FIG. 8 showing the steering post construction;

FIG. 10 is a partial and enlarged cross sectional view of the details of the wheel spindle bearing construction of the bicycle frame of this invention taken along line 10—10 of FIG. 1;

FIG. 11 is a view in elevation of a unitary half shell member of the bicycle frame shown in FIG. 1;

FIG. 12 is a cross sectional view of the half shell of the bicycle frame of this invention, taken along line 12—12 of FIG. 11; and FIG. 13 is a view in elevation of an internal reinforcing member which is secured within the outer half shell member of FIG. 11.

A vehicle frame constructed in accordance with this invention is illustrated in FIG. 1 as a cantilever type frame for a boy's bicycle. The main frame of the bicycle, generally indicated by reference numeral 10, includes a wheel guard cover 11, a transmission and chain housing 12 and a cross bar 13. The cross bar 13 has a steering post bearing 14 which rotatably supports a front wheel fork 15. The front wheel fork 15 is made in a conventional manner and extends through the steering post bearing 14 and supports a pair of handle bars 16, as shown in dotted lines.

A front wheel fender, generally indicated by the reference numeral 17, comprises an arcuate wheel guard 18 and two converging radial supports 19 and 20 which extend from the wheel guard 18 on both sides of the front wheel. The front wheel fender 17 is comprised of two half shells which are joined together along a plane which bisects the wheel guard 18. The construction of the front wheel fender 17 is similar to that of the main frame 10 and is explained in detail below. As seen in FIG. 3, the radial support 20 has a channel shaped cross section and is snugly fitted over the tubular front wheel fork 15. The wheel guard 18 has an aperture 21 through which the steering column 22 of the front wheel fork 15 is inserted prior to its assembly in the steering post bearing 14 of the cross bar 13. The channel shaped radial supports 20 are clamped over the front wheel fork 15 (see FIG. 3) and are held in place by the nuts 23 on either side of the front wheel spindle.

The main frame 10 has a saddle support 24 at the rear of the cross bar 13 and above the transmission and chain housing 12. The transmission and chain housing 12 has a pedal bearing 25 and a back wheel spindle retainer 26, the details of which are fully described below.

The main frame 10 of the illustrated bicycle frame embodying this invention consists of two preformed half shells which are joined at their edges along a longitudinal, vertical, approximately median plane of the frame. The half shells may be stamped from a light sheet metal, but are preferably molded from a reinforced thermosetting plastic. Fiber glass reinforced polyester resins are particularly suited for use in the vehicle frame of this invention because of their relatively high structural strength and relatively low density. Methods of fabricating such reinforced polyester resins are well known to those skilled in the art.

Each of the half shells 27 and 30 of the main frame 10 of this invention has an abutment face 28 or 29 extending substantially entirely around its periphery which, when the half shells 27 and 30 are mated, join in surface contact and are held together by an appropriate adhesive. Suitable adhesives such as epoxy, polyester and phenolic resins are well known to those skilled in the art. As seen in FIGURES 4, 5, 6, 8 and 11, the mating half shells 27 and 30 have abutting faces 28 and 29 secured together by an appropriate adhesive substantially throughout the cross bar 13, the transmission and chain housing 12, and the wheel guard cover 11.

FIG. 8 in particular shows the detail of the method of joining the half shells 27 and 30 to form the unitary bicycle frame of this invention. This figure shows a cross section of the cross bar 13 portion of the main frame 10. A half shell 27 has an outwardly flaring abutment face 28 which is adjacent an abutment face 29 of the other half shell 30. The abutment face 29 has a flange 31 which extends at a right angle from the abutment face 29 to form a seat with the abutment face 29 into which the other abutment face 28 of the half shell 27 snugly fits. The flange 31 projects over the outer edge of the adjacent abutment face on each side of the cross bar 13 and prevents relative movement between the adjacent faces 28 and 29, as seen in FIG. 8. A channel member 32 covers the adjacent abutment faces 28 and 29 and adds to the appearance of the entire main frame 10 by concealing the union of the abutment faces 28 and 29. The channel member 32 may be fabricated from a complementary colored material or may be of the same color as the half shells 27 and 30. A channel formed from stainless steel or chrome plated metal may be desirable from a decorative standpoint. The adjacent surfaces of the abutment faces 28 and 29 and the channel member 32 are coated with appropriate adhesive, as described above, to prevent separation. When so bonded, the abutment faces 28 and 29 and the channel member 32, constitute a reinforcing bar which extends longitudinally on either side of the cross bar 13 and greatly adds to its resistance to bending. In a similar manner, the abutment faces 28 and 29 and channel member 32 constitute a reinforcing bar extending along the outer surface of the wheel guard cover 11, and the upper and lower surfaces of the transmission and chain housing 12, as shown in FIGS. 4, 5, 6, and 8.

Each of the half shells 27 and 30 of the bicycle frame embodying this invention comprises an outer frame member 33, shown in FIGURE 11, an inner wheel guard 34, shown in FIGURE 13, and a reinforcing insert 35 or 36, shown in FIGURE 10. The outer frame member 33 illustrated in FIGURE 11 comprises a unitary preformed outer half shell which includes one side of the cross bar 13, the transmission and chain housing 12 and the wheel guard cover 11. The outer frame members 33 include the abutment faces 28 and 29 extending substantially entirely around their periphery so as to form an enclosed outer frame when secured together as previously described. The lower portion of transmission and chain housing 12, however, is open from a point below the pedal bearing 25 to the rear of the wheel guard cover 11, as seen in FIGURE 12, forming a recess within which the rear wheel fits.

An inner wheel guard 34, shown in FIGURE 13, reinforces the transmission and chain housing 12 and the wheel guard cover 11 of the main frame 10. Each half of the inner wheel guard 34 comprises a generally semi-circular member which has a downwardly extending skirt 37. As seen in FIGURE 10, the skirts 37 of both of the inner wheel guards 34 are designed to fit within the transmission and chain housing 12 of the main frame 10 to reinforce this area of the main frame. Each of the inner wheel guards 34 has an inwardly curved arcuate surface 38 which, when the halves are mated, comprises a rear wheel guard 39 within the main frame 10, as shown in FIG. 10. Mating surfaces 40 and 41 are bonded by an appropriate adhesive in a similar manner as abutment faces 28 and 29 of the half shells 27 and 30. As seen in FIG. 10, it is unnecessary to cover the junction of the mating surfaces 40 and 41 with a channel such as the member 32, because this junction lies entirely within the main frame 10 and is not visible.

FIG. 10 shows in detail the construction of the reinforced back wheel spindle retainer 26 which, because it supports the major portion of the weight of the bicycle rider, is built up to withstand substantial stress. Each side of the spindle retainer 26 includes the skirt 37 of the inner wheel guard 34, a reinforcing insert 35 or 36, and the lower portion of the outer frame member 33. These three members, when bonded by adhesive throughout their contacting surfaces, as shown in FIG. 10, constitute a "laminated" bearing area which is sufficiently strong to withstand the maximum stress which may be placed upon it from the back wheel spindle.

The upper portions of the rear wheel guard 39 are similarly bonded to the inner portions of the wheel guard cover 11 in the area of a flange 42 as shown in FIGS. 10 and 11. The inner wheel guard 34 has a cooperating flange 43 which nests within the wheel guard cover 11 and its flange 42 to prevent movement and to provide additional adhesive surface. The lowest edges of the wheel guard cover 11 have an inwardly projecting lip 44 which extends over the lowest edges of the inner wheel guard 34 and the reinforcing inserts 35 and 36.

Each of the back wheel spindle retainers 26 (FIG. 11) includes an L-shaped slot 45 which facilitates both removal and fore and aft adjustment of the wheel spindle and each of the inner wheel guards 34 has a similar retainer 26a with a corresponding slot 45a. A cover plate 46, shown in FIGS. 1 and 10, is secured by the rear wheel spindle nut in a complementary recess 47 in the outer surface of the outer frame member 33 of the half shell 27. The edges of the recess 47 prevent rotation of the cover plate 46 when it is secured tightly against the half shell 27. An anchor bolt 48 in the cover plate 46 extends through an arm 49 on the coaster brake 50, as shown in FIGURE 10, and prevents rotation of the coaster brake 50 relative to the bicycle.

FIG. 5 shows the details of the pedal bearing 25 in the forward portion of the transmission and chain housing 12 of the main frame 10. The outer member 33 of the half shell 27, shown on the right of FIG. 5, has a recessed circular opening 50a (also shown in FIGS. 11 and 12), with an inwardly extending flange 51 around the opening. The outer frame member 33 of the other half shell 30, shown on the left of FIG. 5, has a recessed sprocket housing 52 with a concentric circular opening 53 which has an inwardly extending flange 54. When the two half shells 27 and 30 are joined, the inner surfaces of the outer member 33 and the flanges 51 and 54 comprise means for adhesively securing an annular bearing support 55. The annular bearing support 55, which may be fiber glass reinforced resin or a die casting of a light metal, has an annular flange 56 which gives the bearing support 55 additional surface contact with the inner surface of the sprocket housing 52 of the outer member 33 of the half shell 30, as shown in FIG. 5. Radial webs 57 extend from the annular flange 56 and contact the inner surface of the outer member 33 of the opposite half shell 30. As shown in FIGURE 1, these radial webs 57 are equally spaced around the annular bearing support 55 and are at 45 degree angles to the horizontal. The pedal crank 58 is journalled in bushings 59 and 60 within the bearing support 55 and a sprocket plate 61 is secured to a recessed flange 62 in the outer member 33 of the half shell 30 to enclose the pedal sprocket 63. The sprocket plate 61 is removable to provide access to the pedal sprocket 63 for adjustment and repair. Access to the chain 64, which extends from the pedal sprocket 63 to the drive sprocket 65, is through the open skirts 37 below the back wheel spindle retainer 26.

FIGS. 7, 8, and 9 show the details of the construction of the steering post bearing 14 in the cross bar 13. As shown in these figures, a steering post support 66 comprising a tubular body 67 with radially extending fins 68 is secured between the half shells 27 and 30 which have semi-circular recesses 69 and 70 in their abutment faces 28 and 29 which receive the tubular body 67. As shown in FIGURE 7, the half shells 27 and 30 are bonded by adhesive at substantial areas of contact 71. The fins 68 extend radially from the tubular body 67 of the steering post support 66 parallel to the cross bar 13, as shown in FIGS. 2 and 9, and are secured by adhesive at the upper and lower surfaces of the junction of the two half shells 27 and 30, particularly shown in FIGURES 8 and 9. The fins 68 and the substantial areas of contact 71 between the steering post support 66 and the half shells 27 and 30 distribute the force received from the front wheel fork 15 throughout a relatively large area of the cross bar 13.

The steering post bearing 14 also includes bushings 72 and 73 which journal the upwardly extending shaft 74 of the front wheel fork 15, as shown in FIGURES 1, 7, 8 and 9. The shaft 74 is secured within the steering post bearing 14 in a conventional manner and supports handle bars 16 as shown in FIG. 1.

The saddle support 24, which supports a saddle 75 in a conventional manner, shown in FIGS. 1 and 2, is constructed in a manner similar to the steering post bearing 14, and is held between semicircular recesses 76 and 77 in the abutment faces 28 and 29 of the half shells 27 and 30. Two radially extending fins 78 and 79 extend from a tubular saddle bearing 80 at right angles to the fore and aft axis of the bicycle. Fins 78 and 79 also distribute the force from the saddle throughout substantial areas of the frame. Both the steering post support 66 and the saddle support 24 may have more than two opposed fins and may have fins extending both parallel and at right angles to the fore and aft axis of the bicycle.

The bicycle embodying the unitary frame of this invention shown in FIG. 1 includes a front lamp 81 and a rear lamp 82 at the ends of the cross bar 13. Because the cross bar 13 of the vehicle frame of the instant invention is hollow substantially throughout its length, batteries for these lamps may be contained within the frame with access provided through a hinged opening, etc. Other features such as a tool compartment can be provided in the cross bar 13 if desired. A further advantage of the hollow frame of this invention is that it may enclose wires from the lamps 81 and 82 to a wheel generator (not shown) if used in place of a battery pack. Other similar advantages of a frame constructed in the manner described above will be apparent to those skilled in the art.

It will be apparent that various changes and modifications can be made in the specific details discussed above and described in the example without departing from the spirit of the attached claims.

What I claim is:

1. A frame for a vehicle comprising, in combination, a pair of opposed, mating half-shells joined in edge abutment along a longitudinal plane, each of said half shells including (1) a unitary exterior frame member, which, when joined with its opposite member, comprises an outer frame including a body portion and a cantilever cross bar extending from said body portion, said cross bar including means for rotatably supporting a steering post, said body portion including a semi-circular, wheel guard cover having downwardly extending skirts each with opposed means for receiving a rear wheel spindle and a drive spindle, and (2) an interior reinforcing element secured to the inner surface of each of the skirts of the wheel guard cover of said exterior frame member adjacent said wheel spindle receiving means and extending upwardly and inwardly to the plane of abutment, which elements, when said half shells are joined, constitute a longitudinally semi-circular wheel guard within said wheel guard cover of said body portion.

2. A vehicle frame comprising, in combination, a pair of opposed, mating half shells joined in edge abutment along a longitudinal plane, each of said half shells including (1) an outer frame member having abutment faces in said longitudinal plane substantially throughout its irregular periphery and (2) an interior reinforcing element secured to and extending from the non-abutting inner surfaces of said outer frame member to said plane and having abutment faces in said plane, said half shells, when joined, forming a frame comprising a partial wheel closure having opposed wheel and drive spindle support means, and an elongate cross bar extending from said wheel closure and said interior reinforcing elements within said partial wheel closure extending from said wheel and drive spindle support means upwardly over the position of a wheel to form a wheel guard therefor.

3. The vehicle frame of claim 2 including a transverse channel through said cross bar, a bearing sleeve within said channel and reinforcing ribs on said sleeve extending within said cross bar radially from the outer walls of said sleeve to the inner surfaces of said cross bar.

4. A vehicle frame comprising, in combination, a pair of opposed, mating half shells joined in edge abutment along a longitudinal plane, each half shell comprising an outer frame member secured to an inner reinforcing member, each outer and inner member having abutment edges lying in said longitudinal plane, said outer members, when said shells are joined, comprising a wheel guard cover including downwardly depending skirts, support means for a wheel and crank spindle in said skirts and a saddle support means in the upper portion of said wheel guard cover and an elongate cantilever frame bar extending from said wheel guard cover, said frame bar including a steering fork channel extending transversely through said cross bar, said inner reinforcing member comprising, when said half shells are joined, a semi-circular inner wheel guard having substantial areas of its outer face bonded to the inner surface of the lower skirts of said outer member and having matching wheel and crank spindle support means.

5. The vehicle frame of claim 4 including a strengthening layer between the outer face of said arcuate inner wheel guard and said inner surface of the lower skirts of said outer member, said wheel guard, strengthening layer and lower skirts being bonded together to form a laminated section of high strength.

6. A frame for a vehicle comprising, in combination, (1) a pair of opposed, outer half-shells joined in edge abutment along a longitudinal plane, each of said shells including portions forming, with the opposite half shell, a vehicle body portion, a cantilever cross bar extending from said body portion, said cross bar including means for rotatably supporting a steering post, said body portion including spaced apart, downwardly extending wheel skirts having spaced apart, substantially parallel lower edges, and (2) a pair of semi-circular inner reinforcing members within the body portion formed by said outer half shells, said semi-circular inner reinforcing members secured to the inner surfaces of said wheel skirts along said spaced apart lower edges and extending upwardly within said body portion and being joined to one another along their circular edges in said longitudinal abutment plane to form an interior, semi-circular wheel cover and reinforcing member, and opposed means for receiving and supporting a rear wheel spindle in the lower edges of said wheel skirts and said inner reinforcing members whereby said spindle is supported by both said wheel skirts of said outer half shells and said inner reinforcing members.

References Cited by the Examiner

UNITED STATES PATENTS

| | | | |
|---|---|---|---|
| 2,378,961 | 6/1945 | Wallace et al. | 280—281 |
| 2,493,037 | 1/1950 | Simon | 280—281 |
| 2,537,325 | 1/1951 | Bowden | 280—281 |
| 2,755,873 | 7/1956 | Klaue | 280—281 X |
| 2,827,306 | 3/1958 | Roder | 280—281 |
| 2,854,249 | 9/1958 | Jaulmes | 280—280 |
| 3,030,124 | 4/1962 | Holloway | 280—281 |
| 3,039,791 | 6/1962 | Horowitz et al. | |

FOREIGN PATENTS 784,421   10/1957   Great Britain.

BENJAMIN HERSH, *Primary Examiner.*

KENNETH H. BETTS, *Examiner.*